United States Patent [19]

Brandherm

[11] Patent Number: 4,482,940

[45] Date of Patent: Nov. 13, 1984

[54] INTERIOR LIGHTING WITH A ROTARY SWITCH

[75] Inventor: Rolf Brandherm, Gütersloh, Fed. Rep. of Germany

[73] Assignee: Wastfälische Metall Industrie KG Hueck & Co., Lippstadt, Fed. Rep. of Germany

[21] Appl. No.: 553,419

[22] Filed: Nov. 18, 1983

Related U.S. Application Data

[63] Continuation of Ser. No. 357,702, Mar. 12, 1982, abandoned.

[30] Foreign Application Priority Data

Apr. 28, 1981 [DE] Fed. Rep. of Germany ....... 3116757

[51] Int. Cl.³ .................. H02H 3/00; H01H 21/00
[52] U.S. Cl. .................................... 362/74; 200/6 BB; 362/295
[58] Field of Search .................. 362/74, 80, 212, 251, 362/295; 200/6 R, 6 B, 6 BA, 6 BB, 6 C

[56] References Cited

U.S. PATENT DOCUMENTS

| | | | |
|---|---|---|---|
| 2,793,258 | 5/1957 | Engelage | 200/6 BB |
| 3,497,643 | 2/1970 | Heath | 200/6 BB |
| 4,059,738 | 11/1977 | Mongeau | 200/6 BB X |
| 4,133,990 | 1/1979 | Wanner et al. | 200/6 BB X |
| 4,414,611 | 11/1983 | Seltzer et al. | 362/251 X |

FOREIGN PATENT DOCUMENTS

| | | | |
|---|---|---|---|
| 143961 | 12/1935 | Fed. Rep. of Germany | 362/251 |
| 1451580 | 10/1976 | United Kingdom | 362/74 |

*Primary Examiner*—J. R. Scott
*Attorney, Agent, or Firm*—Max Fogiel

[57] ABSTRACT

An interior lighting system for vehicles that has a switch with at least three "on" stages. A shaft of the switch has three cams that activate spring contacts each of which can be tensioned against a fixed contact. The cams are mounted one above the other and at a mutual angle of 45°. At least one cam activates two spring contacts.

3 Claims, 4 Drawing Figures

INTERIOR LIGHTING WITH A ROTARY SWITCH

This is a continuation of Ser. No. 357,702, filed Mar. 12, 1982, abandoned.

BACKGROUND OF THE INVENTION

The invention is an interior lighting system for vehicles that employs a multistage rotary switch with a shaft that is more or less perpendicular to the front of the lighting unit and that has a cam that activates spring contacts with free ends, each of which can be tensioned against an associated fixed contact to establish a connection.

The rotary switches used to illuminate the passenger area in a vehicle can be activated directly by hand in one stage and indirectly in another through a subsidiary switch in the doorway. These two stages are attained with a cam that is attached to the shaft and that acts on two spring contacts.

Contemporary interior light fixtures are often mounted in the roof structure of the vehicle above a point between the driver and the front-seat passenger, from where the fixtures illuminate the passenger area well. Since overall illumination, which may dazzle the driver, is not required for all purposes, it is practical for the lighting system to include a reading state in which the illumination is focused on the front-seat passenger area. The disadvantage of lighting systems that employ a two-stage rotary switch and involve a reading state is that the lighting fixture requires an additional switch for the reading light.

The invention is intended as a simple and easy to manufacture rotary switch with at least three stages for use in lighting systems of the type described above.

SUMMARY OF THE INVENTION

This objective is attained in accordance with the invention by cams, preferably two, mounted one on top of another and each at an angle to another along the shaft, at least one of which will apply tension to one of two spring contacts in accordance with the stage to which the switch is turned and touch the spring contact to a particular fixed contact.

An interior lighting system that employs a switch of this type with at least three stages can be switched into any state that requires overall illumination plus reading illumination.

Most vehicle-roof structures are too shallow to provide much room for building in an interior lighting system of the type in accordance with the invention. The shaft of the switch, which is often perpendicular to the roof, is, considering the added dimensions of the components involved in shifting the switch from one state to another, often too tall. The resulting problem of how to make the shaft shorter can be solved by making the second cam act on a spring contact and by tensioning against it a resilient arm that engages notches on the cam. In this very desirable solution it is also practical to unite the spring contact and the resilient arm into a U-shaped strip of sheet metal that grips the lifter like tongs and is attached at the bottom to the housing of the light. A spring contact and an arm that engages notches on the cam lifter that are made out of one piece of sheet metal can be manufactured simply and cost-effectively and can be mounted easily, snapped in for example, in the light housing.

In another practical embodiment of the invention the two spring contacts that work in conjunction with one of the two cams are made in one piece out of a U-shaped strip of sheet metal that grips the cam like tongs and is attached at the bottom to the housing of the light. This embodiment can be very simple and cost-effective to manufacture when it can be snapped into the light housing and hooked up with a tab connection.

It is also practical for the two cams that are mounted one above the other to be mutually oriented at such an angle that the switch will have three different stages corresponding to three spring contacts tensioned against the cams. An interior lighting system with a switch of this type can have one mode for manually activated illumination of the interior as a whole, one for door-activated illumination of the interior as a whole, and one for manually activated reading illumination, each mode corresponding to one stage of the switch.

The rotary switch for interior vehicle lighting in accordance with the invention can be manufactured very cost-effectively if the shaft, both cams, and the knob, which is activated from outside the switch, are manufactured in one piece out of plastic.

Especially practical is another embodiment of the invention in which the shaft, which carries the knob and both cams, can be emplaced from the front through an opening in the housing that matches the outside contour of the cams. After the shaft has been mounted, the cam nearest the knob can be rotated between two catches in the housing that project toward the rear of the light. The free end of the shaft is mounted in a bearing that is attached to the housing and that longitudinally arrests the shaft and the other end of the shaft rotates along with the knob in the housing. Such an assembly is simple and easy.

BRIEF DESCRIPTION OF THE DRAWING

The drawing illustrates one embodiment of the invention.

DESCRIPTION OF THE PREFERRED EMBODIMENTS

Figure 1:
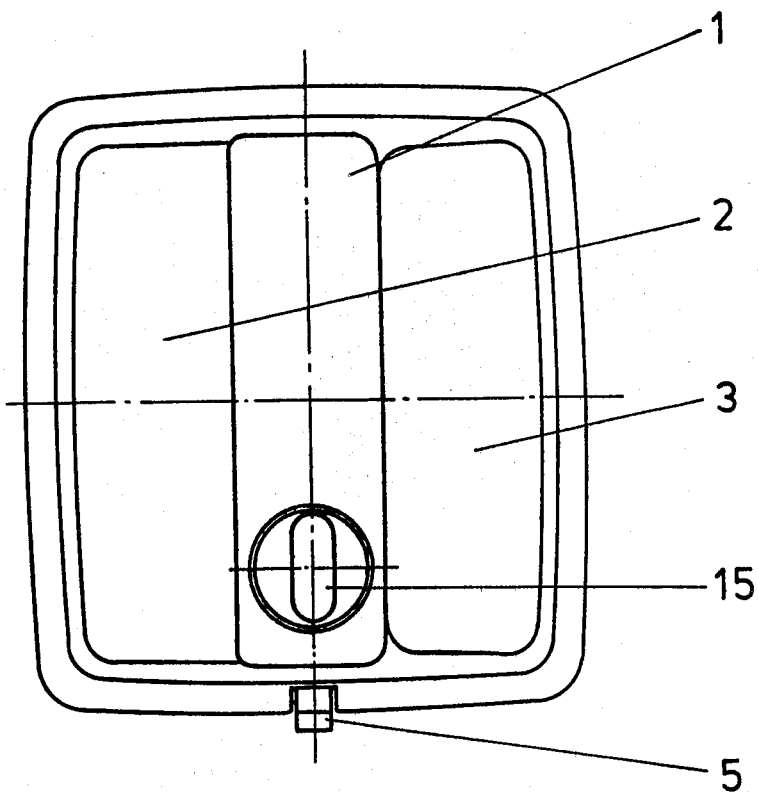
FIG. 1 showing a top view of an interior lighting system with a reading mode and a rotary switch.
Figure 3:
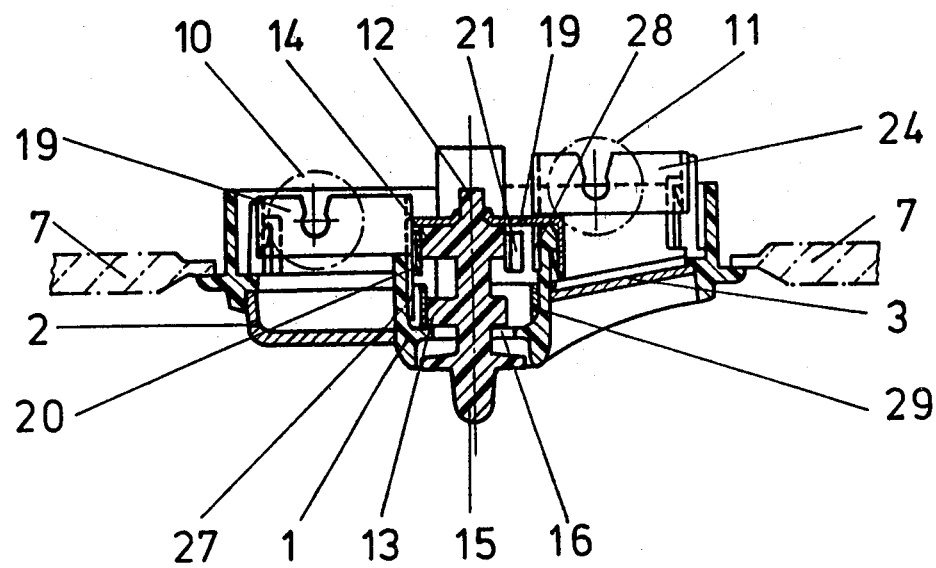
FIG. 3 is a section along the line 3—3 of FIG. 2.
Figure 2:
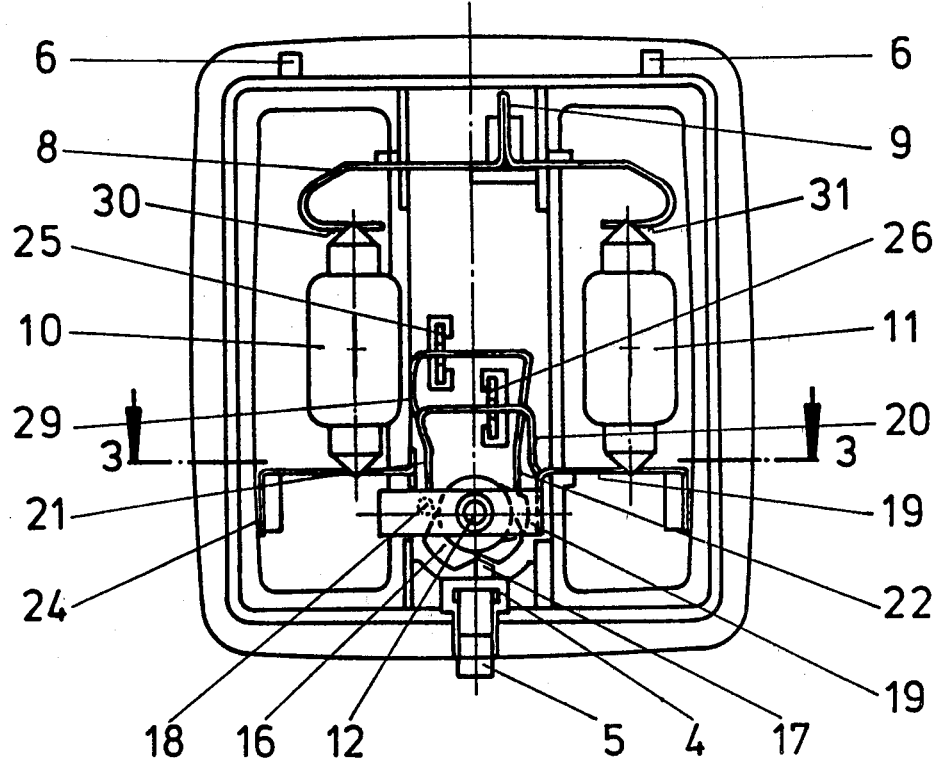
FIG. 2 is a bottom view of the interior lighting system.
Figure 4:
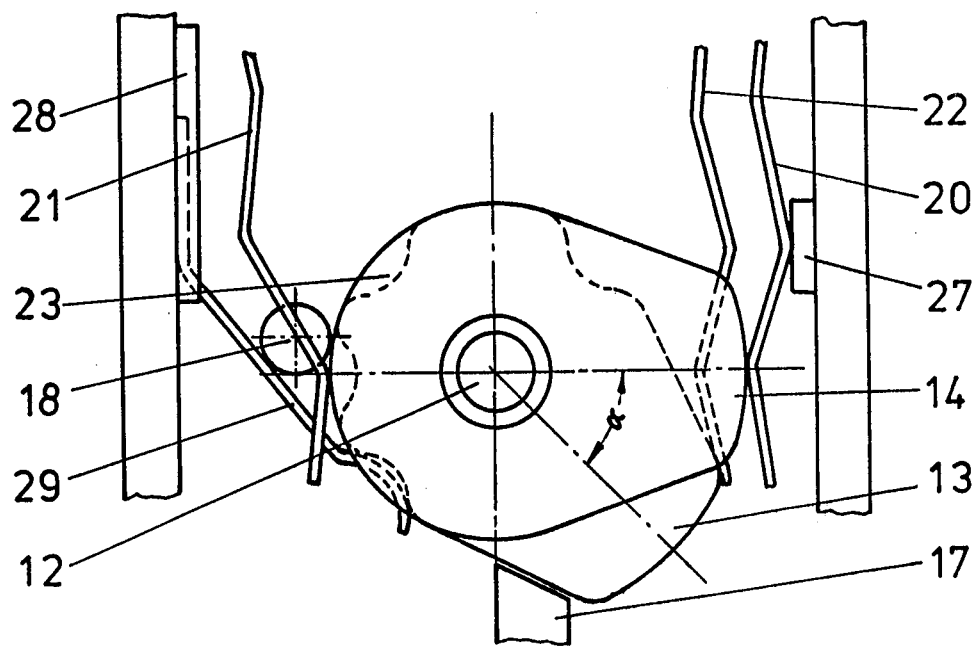
FIG. 4 shows the lamp switch assembly with cam operated contacts and detent structure.

Housing 1 accommodates the switch and holds an overall-illumination glass 2 and a reading-light glass 3. A projection 4 on one side of housing 1 and pointing into the fixture carries a spring clip 5 that works in conjunction with two lugs 6 to fasten the housing to the inside 7 of the roof structure of the vehicle. A spring contact 8 snaps into the side of housing 1 opposite spring clip 5. The middle of contact 8 is bent into a tab connection 9. One end 31 of contact 8 is the terminal of a tubular incandescent bulb 11 that lights the interior of the vehicle as a whole and the other end 30 accepts and conducts electricity from the terminal of another tubular incandescent bulb 10 that provides reading light.

A rotary switch for the lighting system is mounted on the other side of housing 1 between bulbs 10 and 11. The shaft 12 of the switch is essentially perpendicular to the inside 7 of the roof structure and is made out of the same piece of plastic as two cams 13 and 14 and a knob 15. Cams 13 and 14 are mounted one above the other and at a mutual angle α of 45°. Shaft 12 can be simply and easily installed from in front through an opening 16 in housing 1. The shape of opening 16 conforms to the outer contour of cams 13 and 14. When shaft 12 is inserted into housing 1, the cam 13 nearest knob 15 is rotated between two catches 17 and 18 that project toward the rear of the light. The free end of shaft 12 rests in a lamp mount 19 that holds bulb 11 and that lies against cam 14. The other cam 13 lies against the surface of housing 1 that faces the rear of the light and can be rotated about 180° between catches 17 and 18. Shaft 12 is conveniently mounted at the front of the light so as to rotate on knob 15 because the opening 16 in housing 1, which conforms to the outer contour of cams 13 and 14, is too large to secure the shaft.

The cam 14 that lamp mount 19 lies against is gripped as if by tongs by two spring contacts 20 and 21 that are made in one piece out of a U-shaped strip of sheet metal. Another U-shaped strip of sheet metal grips like tongs the other cam 13 that lies against housing 1. The free end of this strip is a spring contact 22 and the other end a detent assembly of a resilient arm 29 that engages notches 23 on cam 13 and rests against one wall of housing 1. The bottom of each U-shaped strip of sheet metal snaps into housing 1 where they contact tap connections 25 and 26, which are inserted into the housing. Since the free ends of spring clips 20, 21, and 22 are zigzagged, they will in accordance with the stage to which the switch is set contact either lamp mount 19 to provide overall illumination or lamp mount 24 to provide a reading light. It is practical for each lamp mount 19 and 24 to have a bent section 27 and 28 that serves as a fixed contact for spring contacts 20, 21, and 22 and that lies against the wall of the housing near them. A rotary switch of this type can have three "on" stages and one "off" stage.

What is claimed is:

1. Interior lighting system for motor vehicles comprising:
   a housing; overall-illumination glass means and reading-light glass means held by said housing;
   a projection on one side of said housing and projecting into the interior of the housing for holding a spring clip;
   lugs on another side of said housing and cooperating with said spring clip to fasten the housing to an inside surface of a motor vehicle roof;
   a spring contact snapped into a side of the housing opposite said spring clip and having a substantially bent tap between ends of said spring contact; said spring contact having one terminal end for one lamp to light overall the interior of said vehicle, said spring contact having another terminal end for another lamp to provide reading light;
   rotary switch means mounted on the outside of said housing between said lamps, said switch having a plastic shaft substantially perpendicular to the inside roof surface of the vehicle;
   two cams and knob means mounted on said shaft, said cams being angularly displaced relative to each other by a predetermined angle, said shaft being installable from in front of the housing through an opening thereof, said opening having a shape conforming substantially to outer contours of said cams;
   two catches in the path of one of said cams and abutted by said one cam;
   lamp mounting means lying against said other cam and holding said shaft;
   two spring contacts comprised of U-shaped metal strip gripping said other cam;
   a third spring contact of U-shaped metal strip gripping said one cam and having a free contact end and another end cooperating with cam notches, each U-shaped metal strip snapping into said housing to contact tap connections inserted into said housing; said lamp mounting means mounting one lamp; another lamp mounting means for mounting said other lamp;
   each lamp mounting means having a bent section comprising a fixed contact for said spring contacts and lying against a wall of said housing adjacent to said spring contacts, said spring contacts lighting selectively said lamps dependent on the angular position of said knob and said shaft, to provide either overall-illumination or reading light.

2. An interior lighting system as defined in claim 1, wherein said shaft, cams and knob means are comprised of one-piece plastic.

3. An interior lighting system as defined in claim 1, wherein said shaft has a free end mounted in a bearing attached to the housing and longitudinally arresting the shaft, the other end of said shaft rotating along with said knob means in said housing.

* * * * *